United States Patent [19]

Saltin

[11] Patent Number: 5,274,896
[45] Date of Patent: Jan. 4, 1994

[54] DESTRUCTION AND RE-USE OF MINERAL WOOL SCRAP

[75] Inventor: Lars Saltin, Västerås, Sweden

[73] Assignee: AGA Aktiebolag, Lidingo, Sweden

[21] Appl. No.: 838,243

[22] PCT Filed: Aug. 23, 1990

[86] PCT No.: PCT/SE90/00543
§ 371 Date: Mar. 5, 1992
§ 102(e) Date: Mar. 5, 1992

[87] PCT Pub. No.: WO91/03435
PCT Pub. Date: Mar. 21, 1991

[30] Foreign Application Priority Data

Sep. 6, 1989 [SE] Sweden ................................. 8902937

[51] Int. Cl.⁵ .......................... C03B 37/01; B07B 13/00
[52] U.S. Cl. .......................... 29/403.1; 65/2; 65/19
[58] Field of Search ................ 29/403.1, 403.4; 65/2, 65/19, 15; 75/414, 573, 574, 575, 576, 577-; 266/212, 900; 501/28, 29, 36

[56] References Cited

U.S. PATENT DOCUMENTS

| | | | |
|---|---|---|---|
| 3,709,670 | 1/1973 | Eriksen | 65/15 X |
| 4,365,984 | 12/1982 | Gee | 65/5 X |
| 4,617,045 | 10/1986 | Bronshtein | 65/27 X |
| 4,797,142 | 1/1989 | Jensen | 65/19 X |
| 4,877,449 | 10/1989 | Khinkis | 65/135 X |
| 5,114,474 | 5/1992 | Wilhelm et al. | 65/19 X |
| 5,123,941 | 6/1992 | Laurén et al. | 65/15 |

Primary Examiner—Timothy V. Eley
Attorney, Agent, or Firm—Pollock, Vande Sande & Priddy

[57] ABSTRACT

A method of destructing mineral-wool scrap and reusing the scrap in the manufacture of mineral wool includes introducing the mineral-wool scrap in a finally divided state into a container causing the finely-divided mineral-wool scrap to pass through a heating zone generated by an oxygen burner such as to convert the mineral-wool scrap to a liquid state and delivering the molten mineral-wool scrap into a furnace in which a melt for manufacturing mineral-wool is produced or to an intermediate container mounted between the furnace and a spinning machine. When the molten mineral-wool scrap is being delivered to the intermediate container, molten material taken from the furnace is also delivered to the intermediate container.

9 Claims, 1 Drawing Sheet

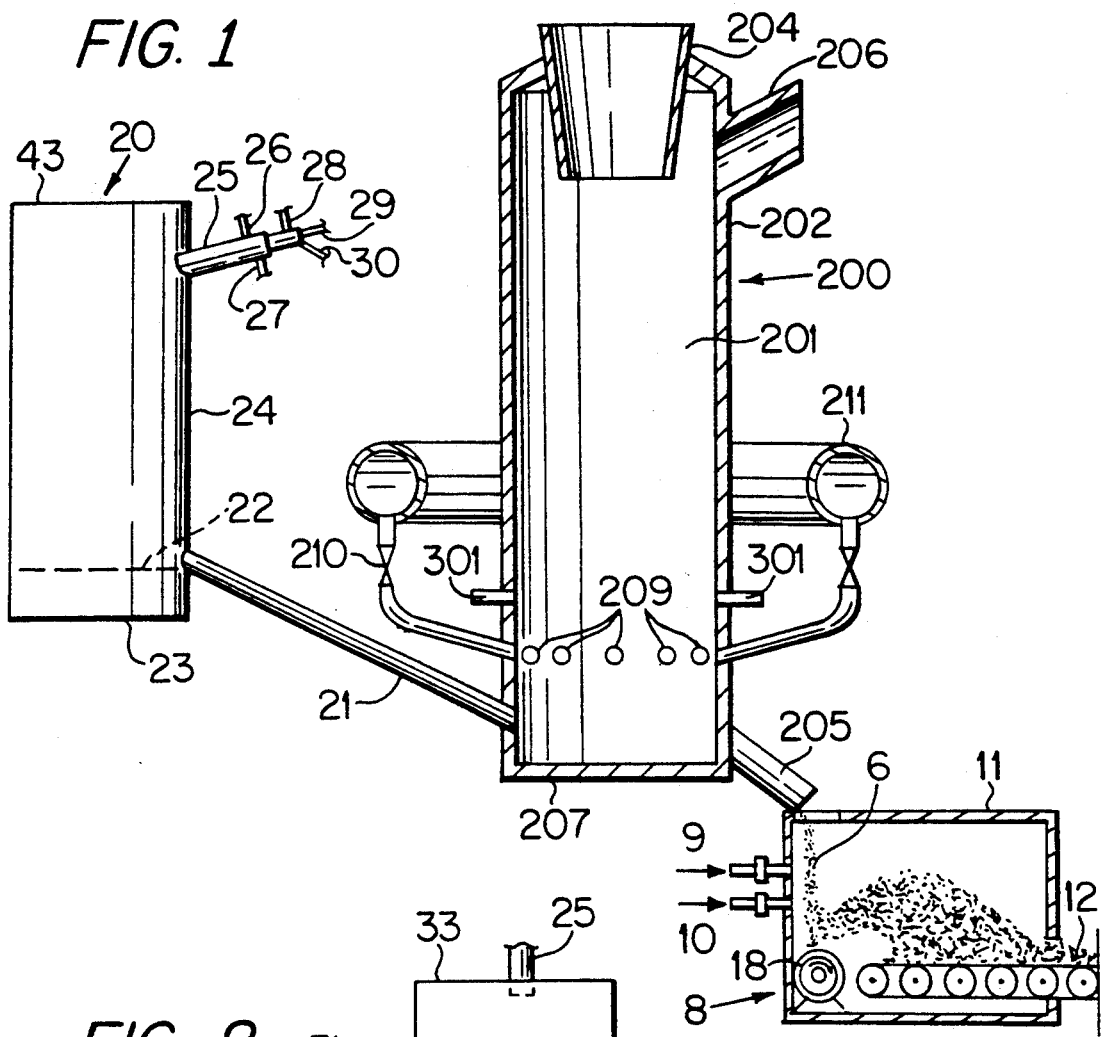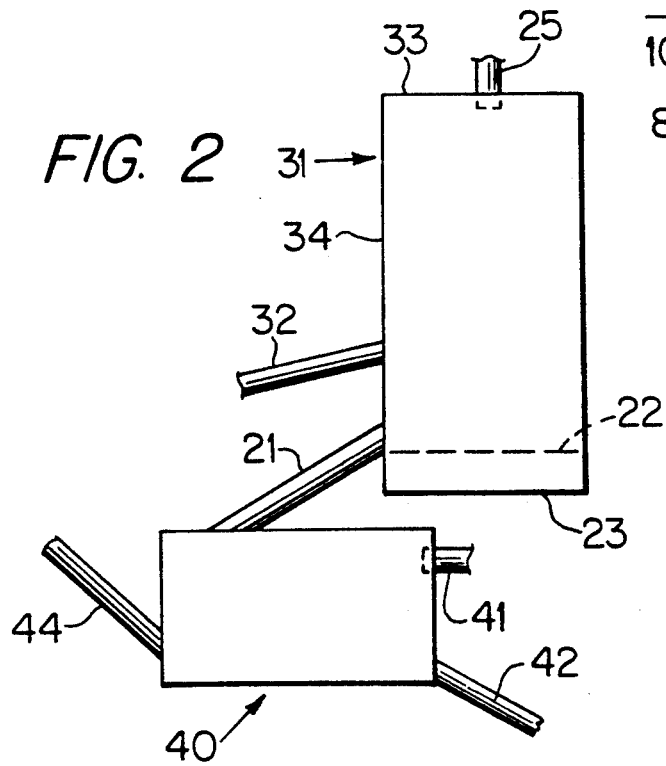

5,274,896

DESTRUCTION AND RE-USE OF MINERAL WOOL SCRAP

FIELD OF THE INVENTION

The present invention relates to a method for the destruction of mineral wool scrap and the re-use of the scrap in the manufacture of mineral wool, and also to an apparatus for carrying out the method.

BACKGROUND OF THE INVENTION

In the manufacture of mineral wool, up to 30% of the mineral-wool mass taken from the furnace is scrapped as waste. Waste also occurs from the spinning machine, from the skiving or side-cutting of mineral wool into blocks, from faulty conditions during the manufacture of the mineral-wool mass, and in the transportation of the mineral-wool mass to or within the spinning machine. Mineral-wool waste may also constitute material which has been scrapped after use, for example mineral wool that has been used for plant cultivation purposes in the absence of soil, this material being considered unsuitable for further use at the end of the cultivating season and consequently being returned to the manufacturer for destruction.

One method of destructing and, at the same time, utilizing such mineral-wool waste or scrap is to press the mineral wool into briquette form, while admixing the scrap with additives, such as cement for instance, for the purpose of increasing the mechanical strength of the briquettes. These briquettes are charged to the furnace together with a conventional starting material, diabase and coke. This method is cost demanding, due to the necessity of compressing the mineral wool and admixing metered quantities of additives therewith. Since some of the briquettes do not have mechanical strength sufficient to withstand the stresses to which they are subjected such briquettes will be crushed in the furnace and therewith prevent hot furnace gases from flowing upwards in the furnace to preheat the furnace charge and exit from the furnace.

Another method, described in WO 87/07591, is to introduce the mineral-wool scrap into the furnace with the aid of a burner. In this case, the scrap is introduced into the furnace together with a fuel or with a gas needed for combustion, for example air or oxygen, depending on the burner construction. The drawback of this method resides in the difficulty encountered in controlling the furnace temperature, and the temperature of the resultant melt is particularly liable to vary with time. When the power generated by the burner is too low in relation to the amount of waste introduced through the burner, non-melted scrap material is likely to block the path of the exiting furnace gases which flow through the furnace to the furnace outlet.

An object of the present invention is to avoid the above drawbacks associated with known techniques, and to provide a method by means of which mineral-wool scrap can be destructed in a controlled fashion without negative influence on the operating conditions of the furnace used to produce the mineral-wool melt.

Another object of this invention is to utilize the destructed waste in the manufacture of mineral wool.

A further object is to provide apparatus operative to convert mineral-wool scrap to a molten form for the manufacture of mineral wool.

Thus, the present invention relates to a method of destructing mineral-wool scrap and re-using the scrap in the manufacture of mineral wool, by producing in a furnace a melt intended for use in the manufacture of mineral-wool. The method includes the steps of introducing finely-divided mineral-wool scrap into a container and causing the finely-divided scrap to pass through a heating zone generated in the container by an oxygen burner and in which the mineral-wool scrap is converted to a molten state; and passing the molten mineral-wool scrap to a molten bath generated in a furnace for use in the manufacture of mineral wool, or to an intermediate container located between the furnace and a spinning machine, by passing the melt from the furnace to the intermediate container. The present invention also relates to an apparatus for destructing mineral-wool scrap and reusing the scrap for the manufacture of mineral wool, by producing in a furnace a melt intended for use in the manufacture of mineral-wool, the apparatus including a container, at least one oxygen burner mounted in the container wall and operative to bring the mineral-wool scrap to a molten state, and at least one conduit for removing molten mineral-wool scrap, the conduit connecting the container to the furnace or to an intermediate container arranged between the furnace and a spinning machine.

The present invention will now be described in more detail with reference to the accompanying drawing, in which

BRIEF DESCRIPTION OF THE DRAWINGS

FIG. 1 illustrates schematically and in vertical section a conventional plant for the manufacture of mineral wool to which the present invention apparatus for re-using mineral-wool waste is connected; and FIG. 2 is a schematic, vertical sectional view of another embodiment of the inventive apparatus.

DETAILED DESCRIPTION OF THE PREFERRED EMBODIMENT

The apparatus illustrated schematically in FIG. 1 includes a cupola furnace 200 comprising a substantially cylindrical furnace chamber 201 which is surrounded by a water-cooled wall 202. Arranged in the upper part of the furnace is a hopper, the lower part of which is shown to have the form of a container 204 which is connected to the furnace through the intermediary of a feed valve, not shown. The feed valve enables starting material, substantially diabase and carbonaceous material, to be supplied intermittently to the furnace and also functions to prevent gas from leaving the furnace through the container 204. A flue-gas outlet 206 is provided in the upper part of the furnace.

The furnace 200 has a flat bottom 207 and slightly above the furnace bottom 207 there is provided an outlet 205 through which mineral-wool forming molten material exits from the furnace A number of tuyeres 209 are disposed in a horizontal ring around the lower part of the furnace wall 202 and extend over the melt in the furnace. Each of these tuyeres 209 is connected by a respective valve 210 to a circular supply line 211 which is connected to the source (not shown) of compressed air or air which is enriched with oxygen.

A number of oxygen burners 301 can be mounted on the furnace wall 202. These burners are also disposed horizontally in a ring and are positioned at regular intervals. The burners are equipped with a cooling jacket and are operated with liquid or gaseous fuel, preferably oxygen. The necessary supply lines for these burners are not shown in the drawing.

The raw material used to produce the intended melt, such as coke, is charged to the furnace through the container 204, and passes through the valve prior to entering the furnace. The material introduced into the furnace is first located in a preheating zone, in which it meets upwardly flowing flue gases. The material is heated by the combustion heat generated when combusting the coke with oxygen, in an oxidation zone in which the tuyeres are arranged and optionally also the burners 301.

The resultant molten bath, which collects on the bottom of the furnace, runs from the furnace through a conduit or tapping chute 205, from which a tapping jet 6 runs down into a spinning machine 8 and there impinges on a rapidly rotating spinning wheel 18. Small quantities of plastic material and oil are supplied to the spinning machine through conduits 9 and 10 respectively. The melt is converted in the spinning machine to gossamer-thin fibres, by centrifugal force. The plastic material supplied to the spinning machine functions as a binder and the oil renders the product dust-free and water repellent. The thin fibers or filaments are drawn by suction onto a conveyor belt in the spinning chamber 11, and form a thick carpet 12 on the belt. The carpet is then conveyed from the spinning chamber to the next stage of the manufacturing process.

The arrangement illustrated in FIG. 1 also includes a container 20 for the destruction of mineral-wool waste. The container of this embodiment preferably has the form of an upright cylinder comprising a cylindrical shell-wall 24 and circular top and bottom defining walls 43 and 23 respectively, and is lined internally with a refractory material At least one burner 25 is mounted in the cylindrical shell-wall 24 in the upper part of the container 20. The burner is directed downwards and "tangentially". By "tangentially" it is meant in accordance with the present invention, substantially tangentially, that is the burner is directed so as to obtain a flow of combustion gases which follow the inner surfaces of the wall 24, in a helical line. When several burners are used, the burners are disposed symmetrically on the same horizontal level or on different levels in the upper part of the shell-wall 24 of the container 20.

The burner 25 is provided with a water-cooled jacket having a cooling-water inlet 27 and a cooling-water outlet 26. Also provided is an inlet 28 for oxygen-containing gas, preferably a gas that contains at least 90% oxygen, and a fuel inlet 30, for example lateral gas or propane, and an inlet for disintegrated mineral-wool waste. The waste is introduced to the container with the aid of an ejector means (not shown) driven by air, oxygen-enriched air or solely oxygen. The waste leaves the burner through a central opening in the front end of the burner, together with the gas intended for transportation of the waste. The oxygen-containing gas leaves the burner through a ring-shaped exit opening or through a plurality of exit openings disposed in a ring adjacent the cooling jacket. The fuel leaves the burner in the form of an annulus between the waste and the oxygen-containing gas. The waste melts as it comes into contact with the flames generated by the oxygen-containing gas and the fuel, and any waste which does not melt upon contact with the flames is melted when coming into contact with the hot container wall.

The molten waste, which forms starting material for the manufacture of mineral wool, is collected at the bottom of the container 20, and when the molten bath reaches a level 22, the melt runs through a conduit or chute 21 and enters the furnace 200. The furnace inlet is located slightly above the furnace bottom 207 and at a higher level than the level at which the outlet chute or conduit 205 depart from the furnace. Melt from the container 20 is mixed in the furnace with the melt produced therein. A burner or some other kind of heating device may optionally be mounted adjacent the conduit 21, in order to prevent molten mass from solidifying and blocking the conduit.

The melt leaves the furnace 200 through the tapping chute 205, which as in the case of the chute 21 may be provided with a burner or like heating device, and is discharged from the chute 205 into the spinning machine 11.

FIG. 2 illustrates another container 31, which may have a circular or rectangular, horizontal cross-section, the word rectangular also including a square, of course. The burner 25 is mounted in the upper defining wall 33 of the container and is directed down onto the bottom 23 of the container 31. As with the container 20, the container 31 is lined with refractory material. Mounted in the side wall 34 of the container 31 is a conduit or chute 21 which connects the container 31 with an intermediate container 40. Mounted in the side wall 34, in the lower part of the container 31, and extending over the chute 21 is a connecting conduit 32 which connects the container 31 with the furnace 200. The connecting conduit 32 discharges into the furnace 200 at a level approximately equal to the levels of respective tuyeres 209 in the furnace.

The intermediate container 40 is connected to the furnace 200 through the outlet conduit 44, which discharges into the lower part of the intermediate container 40. A burner 41 may be mounted in the upper part of the intermediate container 40, for the purpose of maintaining the melt in the intermediate container 40 at the predetermined temperature. A conduit 42 extends from the intermediate container 40 to the spinning machine chamber 11.

When using the device illustrated in FIG. 2, molten material passes from the furnace through the conduit 44 and into the intermediate container 40. Disintegrated mineral-wool waste is also delivered through the burner 25, wherein the waste is melted and collected on the bottom of the container 31. When the melt in the container 31 reaches the level 22, molten material will flow through the chute 21 and into the intermediate container 40. The hot gases generated by the burner 25 flow through the conduit 32 and into the furnace 200, where they assist in melting the starting material. The molten material collected on the bottom of the intermediate container 40 flows from the container to the spinning machine chamber 11 through the conduit 42.

The container 31 may comprise the container 20 described with reference to FIG. 1 and provided with the connecting conduit 32.

According to one modification of the device described with reference to FIG. 2, the connecting conduit 32 leading to the furnace 200 may be omitted. In this case, the waste gases generated by the burner 25 flow through the chute 21 and into the intermediate container 40. This obviates the need to heat the intermediate container with the burner 41. The waste gases then flow from the intermediate container 40 to the furnace 200, through the conduit 44.

According to another embodiment of the present invention, still another connecting conduit may be mounted between the furnace 200 and the intermediate container 40. This conduit discharges into the intermediate container 40, in the upper part of its vertical side wall, and is intended to permit waste gases arriving at the intermediate container through the chute 21 to flow into the furnace 200.

I claim:

1. A method of destructing mineral-wool scrap and reusing said scrap in the manufacture of mineral wool, said method comprising the steps of:
    introducing the mineral-wool scrap in a finally divided state into a container;
    causing the finely-divided mineral-wool scrap to pass through a heating zone generated by an oxygen burner such as to convert the mineral-wool scrap to a liquid state;
    delivering the molten mineral-wool scrap into a furnace in which a melt for manufacturing mineral-wool is produced or to an intermediate container mounted between the furnace and a spinning machine, and
    when the molten mineral-wool scrap is being delivered to the intermediate container, delivering to the intermediate container molten material taken from the furnace.

2. A method according to claim 1, wherein the mineral-wool scrap is introduced into the container pneumatically, through a passageway in the oxygen burner.

3. A method according to claim 1 further comprising introducing hot combustion gases generated by the oxygen burner into the furnace at a level above the level of a molten bath in the furnace.

4. A method according to claim 3, further comprising introducing the hot combustion gases into the furnace via the intermediate container.

5. A method according to claim 3, further comprising introducing the hot combustion gases into the furnace via a separate conduit located between the container and the furnace.

6. A method according to claim 1, wherein the mineral-wood scrap is delivered to the upper part of the container including a substantially upstanding cylinder.

7. A method according to claim 6, further comprising introducing the mineral-wool scrap tangentially.

8. A method of destructing a mineral-wool scrap and reusing said mineral-wool scrap in the manufacture of mineral wool, said method comprising the steps of:
    introducing a mineral-wool scrap in a finally divided state into a container;
    causing the finely-divided scrap to pass through a heating zone generated by an oxygen burner such as to convert said mineral-wool scrap to a molten state; and
    delivering the molten-wool scrap into a molten bath generated in a furnace for use in the manufacture of mineral-wool, thereby reusing said mineral-wool scrap to manufacture the mineral-wool.

9. A method of destructing a mineral-wool scrap and reusing said mineral-wool scrap in the manufacture of mineral wool, said method comprising the steps of:
    introducing a mineral-wool scrap in a finally divided state into a container;
    causing the finely-divided scrap to pass through a heating zone generated by an oxygen burner such as to convert said mineral-wool scrap to a molten state;
    delivering the molten mineral-wool scrap to an intermediate container mounted between a furnace in which a melt for manufacturing mineral-wool is produced and a spinning machine; and
    delivering to the intermediate container with the molten mineral-wool scrap, molten material taken from the furnace to manufacture the mineral-wool.

* * * * *